US012793111B2

(12) United States Patent
Taday et al.

(10) Patent No.: US 12,793,111 B2
(45) Date of Patent: Nov. 10, 2026

(54) SYSTEMS AND METHODS FOR TOKENIZATION, RECORDATION, PAYMENT, SETTLEMENT, INSTRUCTION, RETIREMENT, DATA MANAGEMENT, AND OUTPUT OF INTELLIGENT DATA RELATED TO ASSETS AND ASSET ATTRIBUTES

(71) Applicant: JPMORGAN CHASE BANK, N.A., New York, NY (US)

(72) Inventors: Aditya Mayur Taday, Hoboken, NJ (US); Alexandra Prager Miller, Brooklyn, NY (US); Alexandros Mylonas, New York, NY (US); Angela Pratt, Manhattan, NY (US); Angelo Aratan, Brooklyn, NY (US); Dylan Paul, Woodmere, NY (US); George Kassis, London (GB); Haijing Zhang, New York, NY (US); Jitendra Bhurat, Princeton, NJ (US); Manmeet Ahluwalia, Tampa, FL (US); Patricia Jaimez Gómez, Madrid (ES); Renuka Belwalkar, Manhattan, NY (US); Shawn M. Roling, New York, NY (US); Sophia Wasserman, New York, NY (US); Tyrone D. Lobban, Loughton (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 65 days.

(21) Appl. No.: 18/765,842

(22) Filed: Jul. 8, 2024

(65) Prior Publication Data

US 2025/0014083 A1 Jan. 9, 2025

Related U.S. Application Data

(60) Provisional application No. 63/512,256, filed on Jul. 6, 2023.

(51) Int. Cl.
*G06Q 30/00* (2023.01)
*G06Q 30/0601* (2023.01)
(Continued)

(52) U.S. Cl.
CPC ......... *G06Q 30/0613* (2013.01); *G06Q 50/06* (2013.01); *H04L 67/104* (2013.01); *G06Q 2220/00* (2013.01)

(58) Field of Classification Search
None
See application file for complete search history.

(56) References Cited

U.S. PATENT DOCUMENTS 10,567,393 B2 2/2020 Metzger et al.
11,710,199 B1 * 7/2023 Cali ...................... G06Q 50/06 705/37

(Continued)

FOREIGN PATENT DOCUMENTS

EP 3736760 11/2020
WO 2019070357 4/2019

OTHER PUBLICATIONS

International Search Report and Written Opinion of the International Searching Authority, dated Jul. 8, 2024, from corresponding International Application No. PCT/US2024/037037.

*Primary Examiner* — Mila Airapetian
(74) *Attorney, Agent, or Firm* — GREENBERG TRAURIG LLP

(57) ABSTRACT

Systems and methods for tokenization, recordation, payment, settlement, instruction, retirement, data management, and output of intelligent data related to assets and asset attributes are disclosed. A method may include: (1) generating or receiving, by a computer program for an asset producer or seller, an asset; (2) storing, by the computer program for the asset producer or seller, the asset; (3) tokenizing, by the computer program for the asset producer (Continued)

or seller, the asset on a distributed ledger network; (4) making, by the computer program for the asset producer or seller, the asset available to a consumer on a marketplace; (5) purchasing, by a computer program for the consumer, the asset with tokenized currency; (6) exchanging, by a smart contract executed on the distributed ledger network, the tokenized asset for the tokenized currency; and (7) causing, by the smart contract, the stored asset to be transferred to the consumer.

17 Claims, 3 Drawing Sheets

(51) Int. Cl.

| | |
|---|---|
| ***G06Q 50/06*** | (2012.01) |
| ***H04L 67/104*** | (2022.01) |

(56) References Cited

U.S. PATENT DOCUMENTS

| | | | | |
|---|---|---|---|---|
| 11,836,711 | B2 | 12/2023 | Moudgal et al. | |
| 12,099,997 | B1 * | 9/2024 | Hoffberg | G06Q 20/065 |
| 2013/0219403 | A1 * | 8/2013 | Kasten | H04L 67/14 718/104 |
| 2021/0264407 | A1 | 8/2021 | Moudgal et al. | |
| 2022/0227231 | A1 * | 7/2022 | Husain | B60L 15/2045 |
| 2023/0120979 | A1 | 4/2023 | Kudo et al. | |
| 2023/0385965 | A1 * | 11/2023 | Jacobson | G06Q 50/16 |
| 2024/0046318 | A1 * | 2/2024 | Muriqi | G06Q 30/0273 |
| 2024/0149860 | A1 * | 5/2024 | Zhang | B60W 10/26 |
| 2024/0428306 | A1 * | 12/2024 | Sliwka | H04L 9/0891 |

* cited by examiner

SYSTEMS AND METHODS FOR TOKENIZATION, RECORDATION, PAYMENT, SETTLEMENT, INSTRUCTION, RETIREMENT, DATA MANAGEMENT, AND OUTPUT OF INTELLIGENT DATA RELATED TO ASSETS AND ASSET ATTRIBUTES

RELATED APPLICATIONS

This application claims priority to, and the benefit of, U.S. Provisional Patent Application Ser. No. 63/512,256, filed Jul. 6, 2023, the disclosure of which is hereby incorporated, by reference, in its entirety.

BACKGROUND OF THE INVENTION

1. Field of the Invention

Embodiments relate to systems and methods for tokenization, recordation, payment, settlement, instruction, retirement, data management, and output of intelligent data related to assets and asset attributes.

2. Description of the Related Art

There is a global effort for sustainability and fighting climate change. While today's energy system relies on national grids and powerplants, there is a growing renewable energy infrastructure that include solar panels, microgrids, batteries, smart meters, virtual power plants and other technology and assets that further enable retail and commercial energy consumers to produce renewable energy from alternative energy sources. If these energy producers do not need to use all of the renewable energy they have created, or could create, this excess renewable energy may be left unused or resold to the main utility grid via net metering, wherein the energy loses its characteristic of being derived from renewable sources even if there are willing and able purchasers who do not have access to renewable energy but wish to receive or generate it.

SUMMARY OF THE INVENTION

Systems and methods for tokenization, recordation, payment, settlement, instruction, retirement, data management, and output of intelligent data related to assets and asset attributes are disclosed. In one embodiment, a method may include: (1) generating or receiving, by a computer program for an asset producer or seller, an asset; (2) storing, by the computer program for the asset producer or seller, the asset; (3) tokenizing, by the computer program for the asset producer or seller, the asset on a distributed ledger network; (4) making, by the computer program for the asset producer or seller, the asset available to a consumer on a marketplace; (5) purchasing, by a computer program for the consumer, the asset with tokenized currency; (6) exchanging, by a smart contract executed on the distributed ledger network, the tokenized asset for the tokenized currency; and (7) causing, by the smart contract, the stored asset to be transferred to the consumer.

In one embodiment, the asset may include energy, and the energy may include renewable energy. In one embodiment, the energy may be transferred from a charging station.

In one embodiment, wherein the asset may include a digital asset.

In one embodiment the method may also include: verifying, by the smart contract, a digital identifier for the asset producer or seller and the consumer.

In one embodiment, the computer program for consumer queues the exchange of the tokenized asset for the tokenized currency in response to a network connection to the smart contract being unavailable.

In one embodiment, the method may also include: establishing, by the computer program for the consumer, a peer-to-peer connection with the computer program for the asset producer or seller.

According to another embodiment, a system may include: computer program for an asset producer or seller of an asset; computer program for a consumer; and a distributed ledger network executing a smart contract. The computer program for an asset producer or seller generates or receives the asset, stores the asset, tokenizes the asset on a distributed ledger network, and makes the asset available to a consumer on a marketplace; the computer program for the consumer, purchases the asset with tokenized currency; and the smart contract executed on the distributed ledger network exchanges the tokenized asset for the tokenized currency causes the stored asset to be transferred to the consumer.

In one embodiment, the asset may include energy, and the energy may include renewable energy. In one embodiment, the energy may be transferred from a charging station.

In one embodiment, wherein the asset may include a digital asset.

In one embodiment, the smart contract verifies a digital identifier for the asset producer or seller and the consumer.

In one embodiment, the computer program for consumer queues the exchange of the tokenized asset for the tokenized currency in response to a network connection to the smart contract being unavailable.

In one embodiment, the computer program for the consumer establishes a peer-to-peer connection with the computer program for the asset producer or seller.

According to another embodiment, a non-transitory computer readable storage medium may include instructions stored thereon, which when read and executed by one or more computer processors, cause the one or more computer processors to perform steps comprising: generating or receiving an asset; storing the asset; tokenizing the asset on a distributed ledger network; making the asset available to a consumer on a marketplace; receiving, from a computer program for the consumer, a purchase of the asset with tokenized currency; exchanging the tokenized asset for the tokenized currency; and causing the stored asset to be transferred to the consumer.

In one embodiment, the asset may include energy that may be transferred from a charging station.

In one embodiment, the asset may include a digital asset.

In one embodiment, the non-transitory computer readable storage medium may also include instructions stored thereon, which when read and executed by the one or more computer processors, cause the one or more computer processors to perform steps comprising: establishing a peer-to-peer connection with a computer program for an asset producer or seller; and queuing the exchange of the tokenized asset for the tokenized currency in response to a network connection to a smart contract on the distributed ledger network being unavailable.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
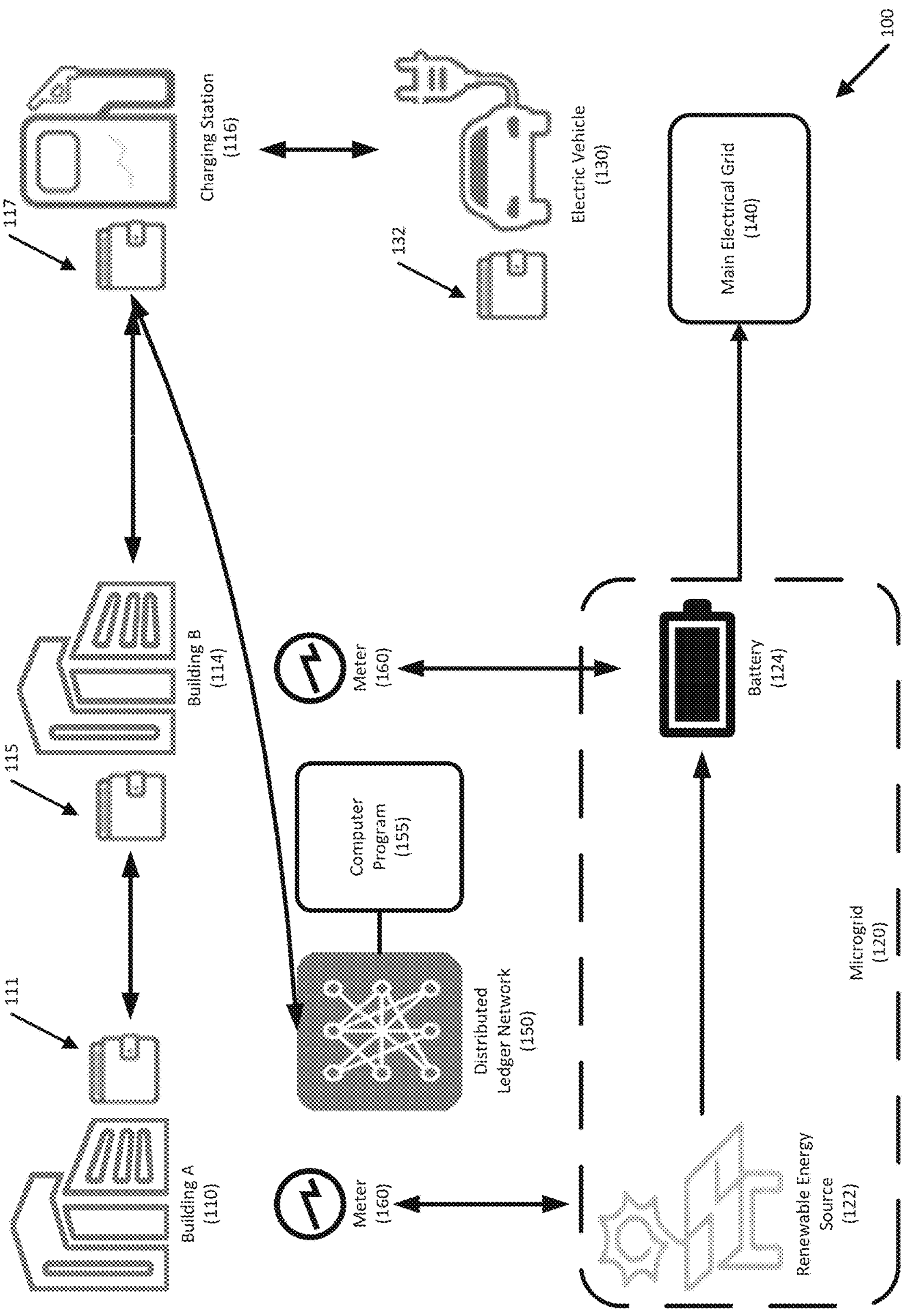
FIG. 1 depicts a system for tokenization, recordation, payment, settlement, instruction, retirement, data management, and output of intelligent data related to assets and asset attributes according to an embodiment.

Embodiments relate to systems and methods for tokenization, recordation, payment, settlement, instruction, retirement, data management, and output of intelligent data related to assets and asset attributes.

Examples of assets include energy (including conventional energy, renewable energy, etc.), digital assets (e.g., weather data, imagery, computer programs, etc.), infrastructure (e.g., Internet of Things (IoT) devices, charging points, satellites, smart building infrastructure, utilities infrastructure, energy infrastructure, etc.), technology assets (e.g., autonomous cars, drones, robots, artificial intelligence, etc.), etc. While embodiments may be described in the context of energy generation and consumption, it should be noted that this is exemplary only, and the creation and distribution of any suitable asset is within the scope of this disclosure.

Embodiments may include a system where assets can be generated, tracked, bought, sold, exchanged, and/or recorded over a distributed ledger network, such as a blockchain-based network. The system may be connected to a network participant's asset infrastructure, such as a commercial business' renewable energy infrastructure, electric vehicle charging stations, etc., or technology asset, such as a commercial business' autonomous vehicle fleet, IoT devices, electric vehicles, etc., and may facilitate instructing such infrastructure or technology to transfer the asset from a producer, holder, or seller of the asset to a consumer, user, or buyer of the asset.

In embodiments, payment functionality may be provided in exchange for digital assets, energy, and other goods/services rendered by such infrastructure and technology assets.

In embodiments, participants may have digital wallets, including smart contract wallets/specialized smart contract wallets and blockchain-enabled wallets; node management systems (e.g., data integrity, security, privacy, etc.); key management systems (e.g., multi-party computation protocols, multi-signature protocols, key management security, privacy, mitigations against misuse, mitigations against double-spending, etc.); identity management systems (e.g., decentralized identity identifiers, verifiable credentials, etc.).

In embodiments, a user having a digital wallet may instruct infrastructure to do various actions, such as to authenticate the user to access the asset, to instruct the infrastructure to apply a discount, loyalty account, etc. to the purchase, etc.

Embodiments may provide the following technical advantages: (1) recording an asset characteristic for an asset when created; (2) maintaining the asset characteristic for the asset after it is sold to a consumer, exchanged or transferred to a user, etc.; (3) using a distributed ledger network, such as a blockchain-based or distributed ledger network, to coordinate decentralized, trustless parties to one shared view of data, such as data recorded on the distributed ledger network; (4) providing tracking of the asset (e.g., ownership of the asset); (5) providing payment functionality for asset producers/holders and consumers/users; (6) facilitate instructions to asset infrastructure or technology to move or transfer assets from the producer/holder to the consumer/user.

Moreover, the exchange of value for assets such as energy, data and their respective asset features may in the future be done through a plurality of participants, both human and non-human, such as artificial intelligence. Such human and non-human interactions may be infrastructure-to-infrastructure, infrastructure-to-technology assets (and vice-versa) (e.g., autonomous vehicles, robots, and software-based artificial intelligence), and technology asset-to-technology asset. Moreover, such interactions may be between two non-human participants.

Referring to FIG. 1, an exemplary description of a system for tokenization, recordation, payment, settlement, instruction, retirement, data management, and output of intelligent data related to assets and asset attributes are disclosed according to embodiments. System 100 may include a plurality of entities, such as Building A 110, Building B 114, and charging station 116. Building A 110 may be a producer of renewable energy using renewable energy source 122 such as solar panels, wind turbines, etc. Building A 110 may consume some of the renewable energy that it creates, and may have excess renewable energy to sell to consumers, such as Building B 114, charging station 116, etc.

Building A 110 may route its excess energy, such as renewable energy, to the consumer using an infrastructure, such as microgrid 120, that may be established between Building A 110 and consumers within a certain proximity, such as Building B 114, charging station 116, electric vehicle 130, etc. Microgrid 120 may be an electrical grid with defined electrical boundaries, acting as a single and controllable entity. Microgrid 120 may be independent of larger electrical grids (e.g., "off-the-grid") or may be connected to a wider electrical power utility. Due to their size and the distance that the renewable energy travels, microgrid 120 may suffer less line loss than larger, conventional electrical grid 140.

Building A 110, building B 114, charging station 116, and/or electric vehicle 130 may further include a battery (not shown) that may be used to store energy, such as energy for future use, excess energy that may be available to sell or exchange, etc.

Microgrid 120 may further include battery 124 for storing renewable energy generated by renewable energy source 122, or any excess energy that may be available.

Alternatively, Building A 110 may send the excess energy to electrical grid 140, and the excess energy may be segregated or otherwise tracked so it maintains a characteristic (e.g., renewable energy). This may be done in conjunction with distributed ledger network 150, such as a blockchain-based or distributed ledger network.

The movement of energy may be tracked on distributed ledger network 150. Distributed ledger network 150 may also facilitate payments to energy producers from consumers for the exchange of energy, which may be referred to energy versus payment and payment versus energy, or "EvP" and "PvE," respectively. For example, embodiments may facilitate an energy marketplace.

In one embodiment, payments may be made offline, such as when there is not a network connection between participants (e.g., buildings 110, 114, electric vehicle 130, charging station 116, etc.) and distributed ledger network 150. For example, buildings 110 and 114, charging station 116, electric vehicle 130, battery 124, renewable energy source 122, etc. may be included in distributed ledger network 150 as a node. The nodes may be full nodes, light nodes, databases, ledgers, or other recordkeeping functionality. Participants may also have a digital wallet (e.g., digital wallets 111, 115, 117, 132) to facilitate payments.

Each participant may locally connect with another participant via their nodes to facilitate an offline payment, an offline attestation, etc.

Embodiments may provide offline payment components, including digital wallets, including smart contract wallets/specialized smart contract wallets, blockchain-enabled wallets, etc.; node management systems (e.g., data integrity, security, privacy, etc.); key management systems (e.g., multi-party computation protocols, multi-signature protocols, key management security, privacy, mitigations against misuse, mitigations against double-spending, etc.); identity management systems (e.g., decentralized identity identifiers, verifiable credentials, etc.). Embodiments may provide peer-to-peer connectivity in the absence of the internet, such as by establishing a peer-to-peer, local connection between a producer and a consumer. Offline transactions may leverage advanced data storage, cryptography (e.g., privacy and encryption), consensus and syncing techniques and technologies, a side chain, queueing, and other techniques and technologies.

Distributed ledger network 150 may include smart contracts (not shown) that may record renewable energy generation, may tokenize value (e.g., currency), and may provide payment versus energy. Thus, when a first entity (e.g., an energy consumer, such as building B 114, charging station 116, electric vehicle 130, etc.) purchases energy from a second entity (e.g., building A 110, charging station 116, etc.), the first entity may provide tokenized value that may cause the payment versus energy smart contract to instruct an infrastructure to move the energy from the second entity to the first entity. For example, the smart contract may facilitate instructing a controller for an infrastructure, such as microgrid 120, to move renewable energy from battery 124, where it may be stored, to the renewable energy consumer.

In embodiments, the amount of energy produced, transferred, and/or consumed may be measured by meters 160. For example, meters 160 may be hardware and/or software that aggregate the capacities of distributed energy resources for the purposes of enhancing power generation, trading, or selling power on the electricity market, and demand side options for load reduction.

In one embodiment, a mobile consumer, such as electric vehicle 130, may use a computer program or application in electric vehicle 130, on the mobile consumer's electronic device (not shown), etc. to receive locations to purchase renewable energy, such as charging station 116, that may receive renewable energy. The mobile consumer and/or electric vehicle 130 may be provided with a digital wallet (e.g., digital wallet 132), such as a smart contract wallet, a blockchain-enabled wallet, etc., that may interface with the distributed ledger network to purchase the energy from the producer, holder, or seller of the energy (e.g., building A 110), or the reseller of the energy (e.g., charging station 116), etc.

In one embodiment, electric vehicle 130 may also be a reseller of renewable energy. For example, electric vehicle 130 may include a battery to store energy, and may interface with another electric vehicle (not shown) or another energy consumer (not shown) to provide that electric vehicle with energy.

Electric vehicle 130 may be an automobile, a truck, etc. but may also include flying vehicles (e.g., drones, fixed and rotary wing aircraft, blimps, etc.), water-based vehicles (e.g., boats, submarines, etc.), hovercrafts, autonomous vehicles, autonomous machines, robots, and also software-based artificial intelligence (e.g., artificial intelligence agents). In embodiments, electric vehicle 130 may exchange other assets (e.g., energy, digital assets, etc.) and other goods/services rendered by the technology asset.

In the context of renewable energy delivery, electric vehicle 130 may be an internal combustion engine-based vehicle, and may also generate its own renewable energy for sale and consumption.

Computer program 155, which may be executed by a node in distributed ledger network 150, may provide artificial intelligence and/or machine learning to predict the production of renewable energy by renewable energy producers, as well as other outcomes related to assets, such as energy data, other digital assets, and data regarding goods/services rendered by infrastructure and technology assets.

For example, a machine learning engine may be trained with historical data, including historical energy usage data, historical renewable energy production data, weather data, solar data, geography, and other variables. It may further be used to price renewable energy that may be offered for sale to consumers.

Each energy producer (e.g., Building A 110), consumer (e.g., Building B 114, electric vehicle 130), and reseller (e.g., charging station 116) may maintain a digital wallet (e.g., smart contract wallet, blockchain-enabled wallet, etc.). Each digital wallet may track each entity's funds (e.g., fiat currency, digital currency, cryptocurrency, deposit tokens, central bank digital currency, etc.) and may be maintained on distributed ledger network 150. Entities may use their digital wallets (e.g., digital wallets 111, 115, 117, 132) to pay for, or be paid for, renewable energy.

In embodiments, payments may occur even when no Internet-based connection is available. Examples of such are described in U.S. Provisional Patent Application Ser. No. 62/981,457, and in U.S. Pat. No. 11,836,711, the disclosures of which are hereby incorporated, by reference, in their entireties. An example of distributed blockchain data management is disclosed in U.S. Pat. No. 10,567,393, the disclosure of which is hereby incorporated, by reference, in its entirety.

In embodiments, the digital wallets may include features to allow offline payments, such as features that mitigate double-spending, features that leverage technology to create a peer-to-peer connection, features that manage keys and signatures (such as private key management, multi-party computation protocols, multi-signature protocols, etc.), private key safety and management, tamper resistance software, etc. Embodiments may also include computation and storage on users' devices (e.g., local or user cloud of choice) for user verification, security, authentication, account abstraction (e.g., private key management, multi-party computation, etc.), etc.

Each digital wallet (e.g., digital wallets 111, 115, 117, 132) may hold, for example, stablecoins and other assets. In one embodiment, the digital wallets (e.g., digital wallets 111, 115, 117, 132) may hold attestations as is described in U.S. patent application Ser. No. 17/174,650 filed Feb. 12, 2021, U.S. Provisional Patent Application Ser. No. 62/976,262 filed Feb. 13, 2020 and U.S. Provisional Patent Application Ser. No. 63/126,335 filed Dec. 16, 2020, the disclosures of which are hereby incorporated, by reference, in their entireties. Examples of attestations may include attestations to identify the consumer, charging station 116, electric vehicle 130, etc., the ownership of attestations as to who owns charging station 116, electric vehicle 130, attestations as to the capabilities of the charging station 116, electric vehicle 130, etc. (e.g., the ability to sell renewable energy, the ability to consume renewable energy, the ability to deliver renewable energy to a remote location, forms of payment accepted, foreign exchange (FX) capabilities, etc.

In one embodiment, the attestations may identify infrastructure (e.g., buildings, microgrids, charging points, etc.) and technology assets (e.g., autonomous cars, drones, robots, artificial intelligence, etc.)

Attestations may also include the ability to access infrastructure assets (e.g., buildings, microgrids, charging points, etc.), to apply a loyalty feature, such as a discount, to the holder, to allow a transaction between holders of attestations, including between infrastructure-to-infrastructure assets, technology-to-technology assets, infrastructure-to-technology assets, technology assets-to-infrastructure, infrastructure and technology asset to human and non-human technology assets (e.g., robots, autonomous vehicles, artificial intelligence), etc.

In one embodiment, attestations may be made offline (e.g., when there is not a network connection between participants and distributed ledger network 150). For example, each participant (e.g., buildings 110, 114), charging station 116, electric vehicle 130, battery 124, renewable energy source 122, etc.) may be included in distributed ledger network 150 as a node. The nodes may be full nodes, light nodes, databases, ledgers, or other recordkeeping functionality). Participants may also have a digital wallet to facilitate providing attestations.

Each participant may locally connect with another participant via their nodes to facilitate an offline payment, an offline attestation, etc.

In another embodiment, the digital wallets (e.g., digital wallets 111, 115, 117, 132) may further store digital identities, or DiDs. Examples of digital identities are described in U.S. patent application Ser. No. 16/878,457 filed May 19, 2020, and U.S. Provisional Patent Application Ser. No. 62/850,18, filed May 20, 2019, the disclosures of which are hereby incorporated, by reference, in their entireties.

Figure 2:
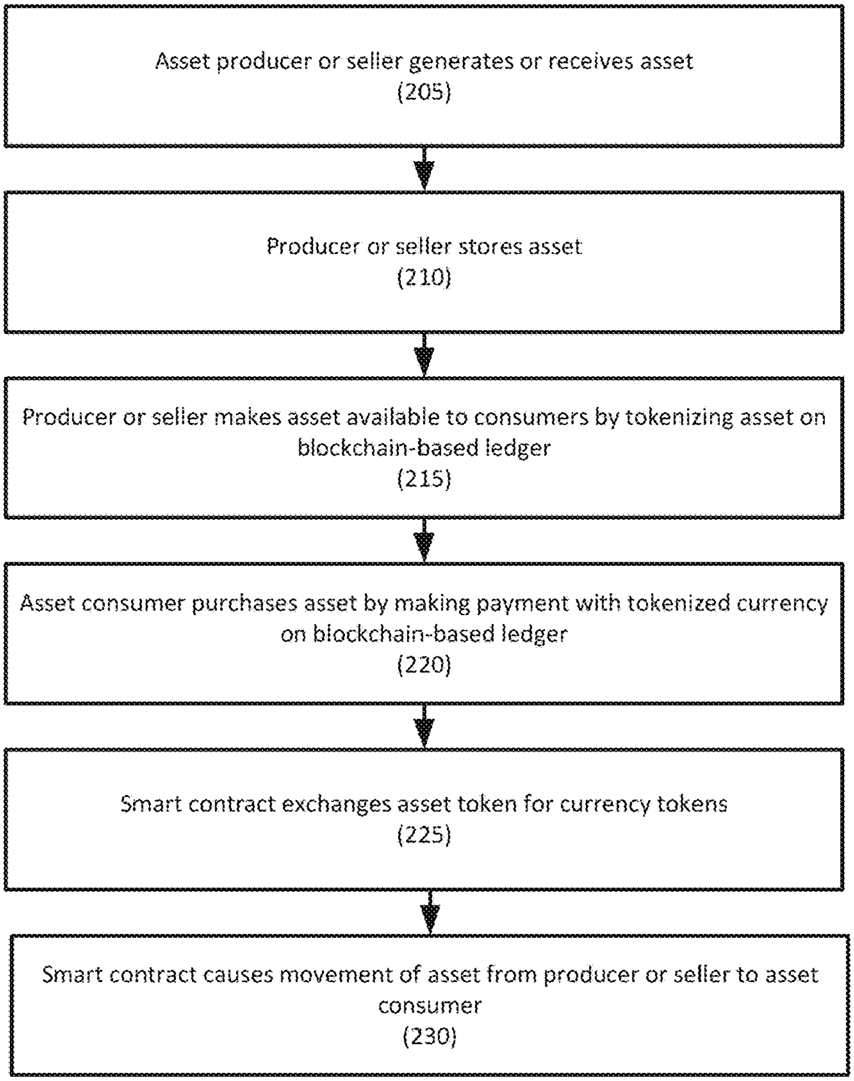
FIG. 2 depicts a method for tokenization, recordation, payment, settlement, instruction, retirement, data management, and output of intelligent data related to assets and asset attributes according to an embodiment.

Referring to FIG. 2, a method for tokenization, recordation, payment, settlement, instruction, retirement, data management, and output of intelligent data related to assets and asset attributes is disclosed according to an embodiment.

In step 205, a producer or seller may generate or receive an asset, such as energy, digital assets, etc. For example, an energy producer may generate energy using solar panels, wind turbines, etc. Other assets, such as digital assets, may be received by the producer or seller from another party, a device that generates the digital asset (e.g., a data producer), etc.

In step 210, the asset may be stored. For example, energy may be stored in one or more batteries as it is produced. As another example, digital assets may be stored in computer memory, in a database, etc.

In one embodiment, an energy holder may receive and may store excess energy in one or more batteries.

In step 215, the producer or seller may make the asset (e.g., excess energy) available to consumers. For example, the producer or seller may tokenize the asset on a distributed ledger network, such as a blockchain-based ledger, a distributed ledger network, etc.

In one embodiment, the asset may be made available to consumers in a marketplace, such as an energy marketplace. The marketplace may be accessed via a computer program or application on the consumer's electronic device, electric vehicles, etc.

In one embodiment, a digital asset may be made available to consumers in a marketplace, such as a data marketplace. The marketplace may be accessed via a computer program or application on the consumer's electronic device, electric vehicles, etc. or accessed via a computer program or application used by a technology asset, etc.

In one embodiment, machine learning and/or artificial intelligence may be used to price the asset.

In step 220, a consumer, such as a building, a utility, a user of an electric vehicle, a consumer of an asset, etc. may purchase the asset. For example, the consumer may use a tokenized value, such as currency, to purchase the asset, and may make payment for the asset using the tokenized currency.

In one embodiment, the consumer may present a digital identifier as part of the purchasing process. The digital identifier may be used to confirm the identity of the consumer, to identify an address for a digital wallet for the consumer, and to identify any discounts or pricing model to be used with the consumer. For example, if the consumer is part of an organization that receives preferred pricing for the asset, the pricing for the asset may be updated to reflect the preferred pricing.

In one embodiment, the consumer may present an attestation that the consumer is authorized to purchase the asset at the preferred pricing, such as an employment attestation, a membership attestation, etc.

The producer or seller may make its digital identifier available, as well as any attestations that it may possess. For example, the producer or seller may provide an attestation that attests that the producer or seller is authorized to sell or resell the asset, an asset characteristic (e.g., that the asset is renewable energy), etc.

In one embodiment, if the asset is provided on or by a mobile platform (e.g., a ground, sea, air, or space-based platform), the consumer may request delivery of the asset to a location of its choosing. For example, if the asset is energy, and the energy consumer has an electric vehicle, the energy consumer may request that the energy producer or seller dispatch the platform with energy to its location, to a location that the energy consumer expects to be, etc.

In step 225, a smart contract executed on the distributed ledger network may identify the purchase and may exchange the tokens for the tokenized currency.

In step 230, the exchange of tokens may cause the asset to move from the producer or seller of the asset (e.g., the battery, a database, etc.) to the consumer (e.g., a battery in an electric vehicle, a memory in an electronic device, etc.). This may be done via a connection (e.g., a peer-to-peer connection, a microgrid, etc.), the Internet, etc.

In one embodiment, the distributed ledger network and its associated technologies (e.g., digital wallets) may facilitate instructions to conduct actions to real-world infrastructure assets (e.g., charging points) and technology assets (e.g., electric vehicles, autonomous machines, robots, drones, etc.).

In one embodiment, if the distributed ledger network is not available (e.g., both entities are in an area in which Internet server is unavailable), the transaction may be written to a side chain, or may be written to a queue, and the transaction may be written to the main distributed ledger chain once either entity re-establishes communication with the distributed ledger network.

In one embodiment, a smart contract for the consumer and a smart contract for the producer or seller may negotiate to reach a price agreement with no or minimal human involvement.

The disclosure of U.S. patent application Ser. No. 15/233,719, U.S. Provisional Patent Application Ser. No. 63/045,659, U.S. Provisional patent application Ser. No. 16/677,609, U.S. Provisional Patent Application Ser. Nos. 62/757,614, 62/446,185, U.S. patent application Ser. Nos. 16/653,369, 16/558,415, 15/869,421, U.S. Provisional Patent Application Ser. Nos. 62/725,331, 62/446,185, 62/948,702, filed Dec. 16, 2019, U.S. Provisional Patent Application Ser. No. 62/525,600, filed Jun. 27, 2017, and U.S. patent application Ser. No. 16/020,473 filed Jun. 27, 2018 are hereby incorporated, by reference, in their entireties.

Figure 3:
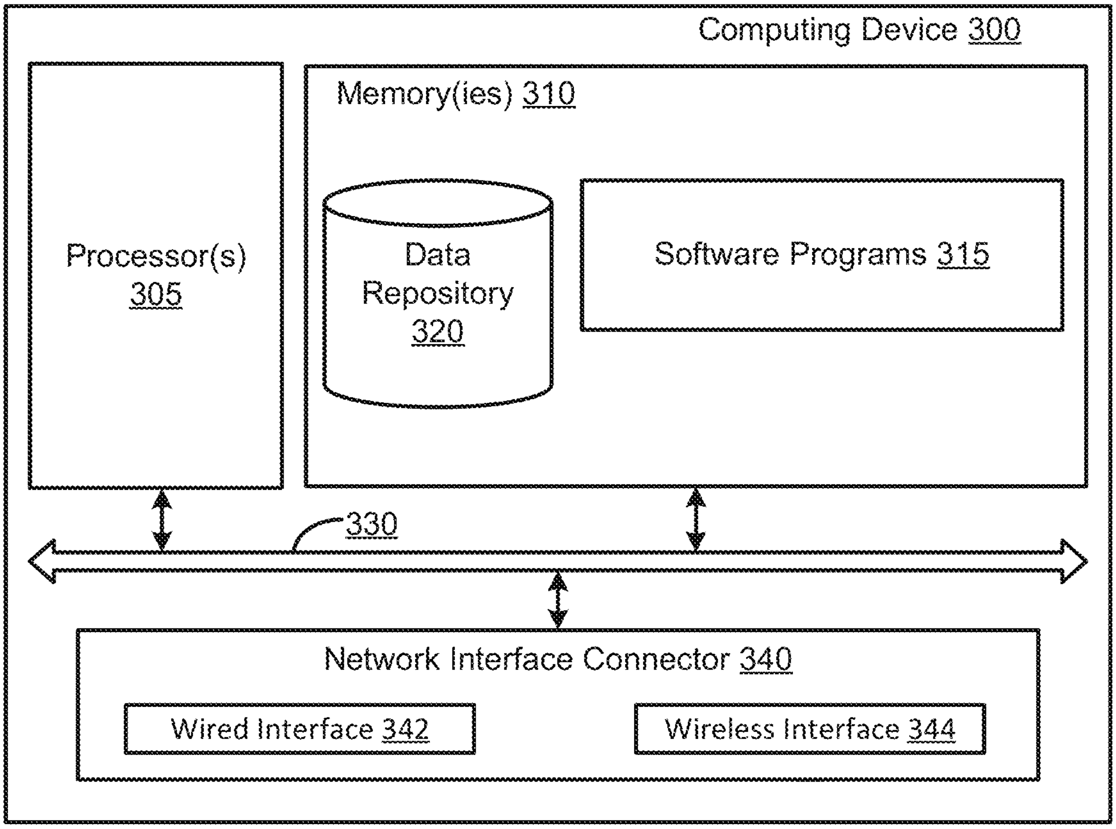
FIG. 3 is a block diagram of a computing device for implementing certain aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method, comprising:

generating or receiving, by an asset producer or seller, a unit of energy;

storing, by a computer program for the asset producer or seller, the unit of energy in a battery;

tokenizing, by the computer program for the asset producer or seller, a representation of the unit of energy on a distributed ledger network;

making, by the computer program for the asset producer or seller, the unit of energy available to a consumer on a marketplace;

purchasing, by a computer program for the consumer, the unit of energy with tokenized currency;

exchanging, by a smart contract executed on the distributed ledger network, the tokenized unit of energy for the tokenized currency; and causing, by the smart contract, the stored unit of energy to be transferred from the battery to a device for the consumer.

2. The method of claim 1, wherein the unit of energy comprises renewable energy.

3. The method of claim 1, wherein the unit of energy is transferred from the battery to the device via a charging station.

4. The method of claim 1, further comprising:

verifying, by the smart contract, a digital identifier for the asset producer or seller and the consumer.

5. The method of claim 1, wherein the computer program for consumer queues the exchange of the tokenized asset for the tokenized currency in response to a network connection to the smart contract being unavailable.

6. The method of claim 1, further comprising:

establishing, by the computer program for the consumer, a peer-to-peer connection with the computer program for the asset producer or seller.

7. A system, comprising:

a computer program for an asset producer or seller of a unit of energy;

a computer program for a consumer;

a distributed ledger network executing a smart contract; and a device for a consumer;

wherein the asset producer or seller generates or receives the unit of energy, stores the unit of energy in a battery, tokenizes a representation of the unit of energy on a distributed ledger network, and makes the unit of energy available to a consumer on a marketplace;

wherein the computer program for the consumer, purchases the unit of energy with tokenized currency; and wherein the smart contract executed on the distributed ledger network exchanges the tokenized unit of energy for the tokenized currency causes the stored unit of energy to be transferred from the battery to the device for the consumer.

8. The system of claim 7, wherein the unit of energy comprises renewable energy.

9. The system of claim 7, further comprising a charging station, wherein the unit of energy is transferred from the battery to the device via the charging station.

10. The system of claim 7, wherein the smart contract verifies a digital identifier for the asset producer or seller and the consumer.

11. The system of claim 7, wherein the computer program for consumer queues the exchange of the tokenized unit of energy for the tokenized currency in response to a network connection to the smart contract being unavailable.

12. The system of claim 7, wherein the computer program for the consumer establishes a peer-to-peer connection with the computer program for the asset producer or seller.

13. A non-transitory computer readable storage medium, including instructions stored thereon, which when read and executed by one or more computer processors, cause the one or more computer processors to perform steps comprising:

generating or receiving a unit of energy;

storing the unit of energy in a battery;

tokenizing a representation of the unit of energy on a distributed ledger network;

making the unit of energy available to a consumer on a marketplace;

receiving, from a computer program for the consumer, a purchase of the unit of energy with tokenized currency;

exchanging the tokenized unit of energy for the tokenized currency; and causing the stored unit of energy to be transferred from the battery to a device for the consumer.

14. The non-transitory computer readable storage medium of claim 13, wherein the unit of energy is transferred from the battery to the device via a charging station.

15. The non-transitory computer readable storage medium of claim 13, further including instructions stored thereon, which when read and executed by the one or more computer processors, cause the one or more computer processors to perform steps comprising:

establishing a peer-to-peer connection with a computer program for an asset producer or seller; and queuing the exchange of the tokenized asset for the tokenized currency in response to a network connection to a smart contract on the distributed ledger network being unavailable.

16. The method of claim 1, wherein the unit of energy is transferred from the battery to a battery in the device for the consumer.

17. The system of claim 7, wherein the device for the consumer further comprises a battery, and, the unit of energy is transferred from the battery to the battery in the device for the consumer.

* * * * *